United States Patent [19]

McCarthy et al.

[11] Patent Number: 4,863,252
[45] Date of Patent: Sep. 5, 1989

[54] OBJECTIVE LENS POSITIONING SYSTEM FOR CONFOCAL TANDEM SCANNING REFLECTED LIGHT MICROSCOPE

[75] Inventors: Jon J. McCarthy; James F. Aeschbach, both of Middleton, Wis.

[73] Assignee: Tracor Northern, Inc., Middleton, Wis.

[21] Appl. No.: 154,907

[22] Filed: Feb. 11, 1988

[51] Int. Cl.$^4$ .............. G02B 26/10; G02B 7/04; G02B 27/02; G02B 21/18
[52] U.S. Cl. .................. 350/507; 350/527; 350/247; 350/130; 350/320; 350/6.3; 350/255
[58] Field of Search ............ 350/507, 527, 510, 524, 350/502, 273, 274, 275, 255, 6.3, 521, 247, 518, 130, 131, 132, 320

[56] References Cited

U.S. PATENT DOCUMENTS

| | | | |
|---|---|---|---|
| 3,013,467 | 12/1961 | Minsky | 356/432 |
| 4,302,830 | 11/1981 | Hamaoka et al. | 350/247 |
| 4,568,142 | 2/1987 | Iguma | 350/6.3 |
| 4,600,282 | 7/1986 | Yamamura et al. | 355/55 |
| 4,679,904 | 7/1987 | Kurihara | 350/6.3 |
| 4,689,491 | 8/1987 | Lindow et al. | 250/572 |
| 4,702,607 | 10/1987 | Kinameri | 356/432 |
| 4,760,265 | 7/1988 | Yoshida et al. | 250/358.1 |

FOREIGN PATENT DOCUMENTS 179948 10/1963 Japan .................... 350/6.3

OTHER PUBLICATIONS

Brakenhoff, "Confocal scanning light microscopy with high aperture immersion lenses," *Journal of Microscopy*, vol. 117, pp. 219-232 (Nov. 1979).
van der Voort, "Design and Use of a Computer Controlled Confocal Microscope for Biological Applications," *Scanning*, vol. 7, pp. 66-78 (1985).
Marsman, "Mechanical Scan System for Microscopic Applications," *Rev. Sci. Instrum.* 54(8), pp. 1047-1052, Aug. 1983.
Stelzer, "Applications of Fluorescence Microscopy in Three Dismensions/Microtomoscopy," *SPIE Biostereometrics*, vol. 602, pp. 63-70 (1985).
Draeijer, "A Real-time Confocal Laser Scanning Microscope (CLSM)," TNO Technical Specifications.
Heidelberg Instruments, "Product Information LSM Laser Scanning Microscope," (Mar. 1987).

*Primary Examiner*—Jon W. Henry
*Attorney, Agent, or Firm*—Arnold, White & Durkee

[57] ABSTRACT

The objective lens in a confocal tandem scanning reflected light microscope is movable relative to the specimen stage by piezoelectric actuators controlled by a closed-loop feedback control system having eddy current sensors to detect lens position. Position control input is either manual or automatic.

1 Claim, 5 Drawing Sheets

OBJ. LENS

OBJECTIVE LENS POSITIONING SYSTEM FOR CONFOCAL TANDEM SCANNING REFLECTED LIGHT MICROSCOPE

FIELD OF THE INVENTION

The present invention relates to light microscopes, and more particularly, it relates to scanning the plane of focus up and down through a specimen to optically section the specimen.

BACKGROUND OF THE INVENTION

Confocal scanning light microscopy involves use of an objective lens to bring light to a focal point in an object plane. Reflected light from the focal plane is brought into focus on a viewing eyepiece. To image an entire field, a mechanical scanning disk having light transmissive areas is used.

The object to be imaged is placed on a scan table or stage in the focal plane between the objective lenses. Heretofore, this table has been moved in the X-Y plane by electromechanical drivers and in the vertical Z direction by mechanical and piezoelectric element drivers Movement of the specimen stage relative to the objective lens has been used for optical sectioning of the specimen.

In the prior art, movement of an objective lens has been used exclusively for optical alignment to ensure confocal operation. Only the vertical movement of the stage has been used to perform optical sectioning.

SUMMARY OF THE INVENTION

The present invention provides a light microscope in which the objective lens is accurately and reproducibly positionable in two axes, perpendicular to and parallel to the optic axis of the instrument. The present invention also provides for positioning of the objective lens electronically using piezoelectric and eddy current sensor elements in a closed loop feedback control system. Positioning motion can be provided either manually or automatically such as by a computer.

The present invention allows an operator to scan the plane of focus up and down through the specimen A relatively thick specimen can be optically sectioned to a depth that depends only upon the working distance of the objective and the degree of translucency of the specimen The tedious and difficult task of slicing the specimen into thin sections is avoided. Also avoided is the complex, expensive scheme of a motor-controlled stage.

The present invention also provides for stereo images to be collected using two axes of motion to produce the required parallax without moving the specimen

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein.

DETAILED DESCRIPTION OF AN ILLUSTRATIVE EMBODIMENT

Tandem scanning microscopy (TSM) involves confocal imaging. Illumination enters through an illuminating aperture on a scanning disk and is focused by objective lenses. Only reflective light from the focal plane of the objective passes through a viewing aperture. Light from above or below the focal plane is not brought to focus on the viewing aperture and is blocked by the disk. The viewing aperture is a conjugate aperture on the observation side of the scanning disk. In practical devices, there are thousands of apertures on the disk.

Objects in the focal plane of the objective are illuminated by the point source, and the light reflected by the specimen is seen by a point detector In practice, the point source and point detector are obtained by placing apertures between a conventional source and detector and the objective lens. Confocal imaging is achieved when the system is precisely aligned via a system of adjustable mirrors and a beam splitter so that rays from the source aperture pass through the viewing aperture. Rays that emerge from objects out of the focal plane are not focused at the viewing aperture and are blocked from reaching the detector The result is a high contrast image of a small portion of the specimen at the focal plane. To see an entire field, a means is required to scan either the specimen or the illumination and detector. This is accomplished by scanning the source and detector by means of a scanning disk having light transmissive areas.

Figure 1:
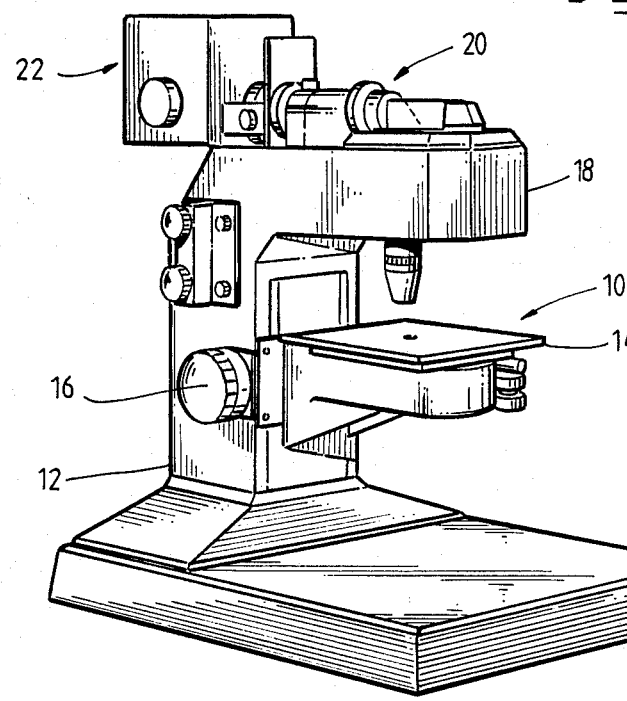
FIG. 1 is an illustration of a confocal scanning light microscope.

The diagram of FIG. 1 illustrates a physical form for a practical TSM instrument. The instrument 10 has a stand 12 for placement on a planar surface such as a table top. The stand 12 supports specimen platform or stage 14. Vertical adjustment of platform 14 is provided by rotation of knobs 16. Mounted atop stand 12 is the head 18 which includes the optical components and scanning disk. Also included is Epi-illuminator 20 which conveys light from the lamphouse 22 into the head. The Epi-illuminator contains several lenses, iris diaphragms and filter holders in order to adjust the apparent brightness and emission spectrum of the light source.

For further information as to the structure for realizing a TSM, U.S. Pat. No. 3,517,980 is hereby incorporated by reference.

Figure 2:
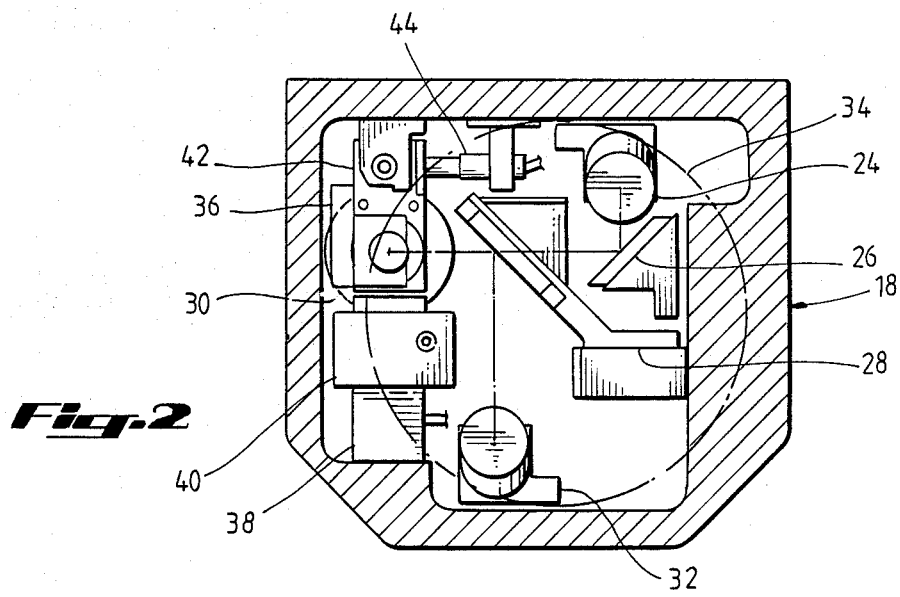
FIG. 2 is a diagram of the interior of the head of the microscope.

A top view through the interior of the head is shown in 2. From this view, the components of the microscope are in view. The optical light path through the device begins at the input mirror 24. Light from this mirror is reflected by steering mirror 26 to the beam splitting pellicle 28. The beam splitter directs light to the objective mirror 30, and the objective lens 36. The objective lens 36 directs the reflected image to the objective mirror 30 and onto the beam splitting pellicle 28. The image is reflected from the pellicle 28 and eyepiece turning mirror 32 and is projected on the scanning disk 34. Also in FIG. 2, the mechanical mounting of the control system for positioning the objective lens is shown.

The confocal scanning system includes an objective lens movable laterally and vertically to its optical axis Movement of the objective lens is by piezoelectric elements. The Z-axis element is item 38, and the X-axis element is item 40. Movement of the objective lens in the Z-axis direction is detected by eddy current sensor 42. Similarly, movement of the objective lens in the X-axis direction is detected by eddy current sensor 44.

Figure 3:
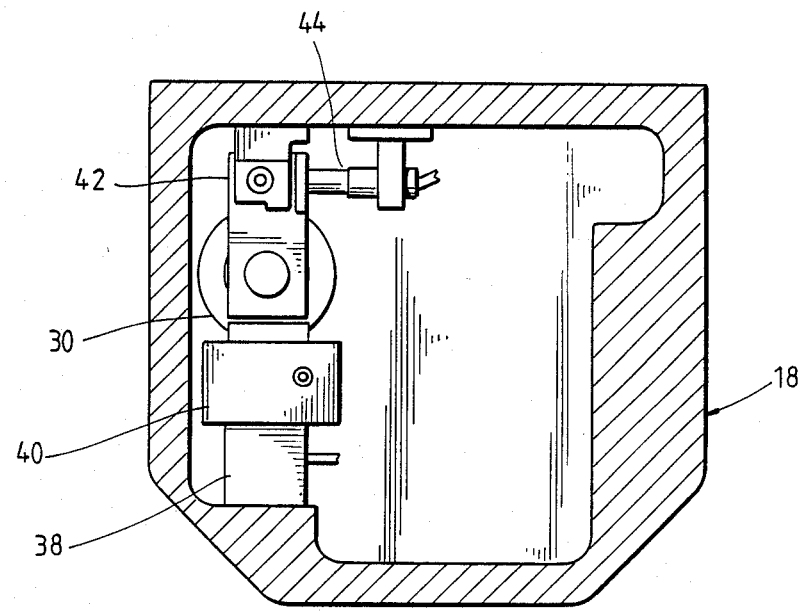
FIG. 3 is a diagram of the objective lens positioner viewed from the top of the head.

Referring to FIG. 3, the objective lens positioning mechanism is further shown in a top view of the microscope housing head. The objective lens mount and the X-axis and Z-axis piezoelectric positioners are shown. Also depicted are the position sensors The piezoelectric positioners are available from Burleigh Instruments, Inc. of Fishers, N.Y., 14453. The preferred device is the model PZS-50TN MICROSTAGE. The eddy current sensor is a two part, non-contacting transducer for proximity detection. One part of the proximity transducer system is the proximity probe and the other part of the system is the sensor amplifier. Shown in FIG. 3 is the proximity probe portion. The preferred proximity probe is the model 82015-00-08-15-02 device available from Bentley Nevada. The preferred sensor amplifier is the model 40892-03 Micro Prox which is also available from Bentley Nevada.

The eddy current sensors detect the movement and the position of the objective lens mount. The proximity transducer sensors operate on the eddy current principle. The proximity transducer senses the distance between the probe tip and the surface it is observing, which is shown in FIG. 3 as the sensor target. A radio frequency is generated through the probe tip into the observed material, setting up eddy currents The loss of energy in the return signal is detected, and an output signal is generated.

The piezoelectric positioning devices are miniature electromechanical devices. The active element is a piezoelectric actuator that expands when voltage is applied. The positioner has a unique position for each applied voltage level.

Figure 4:
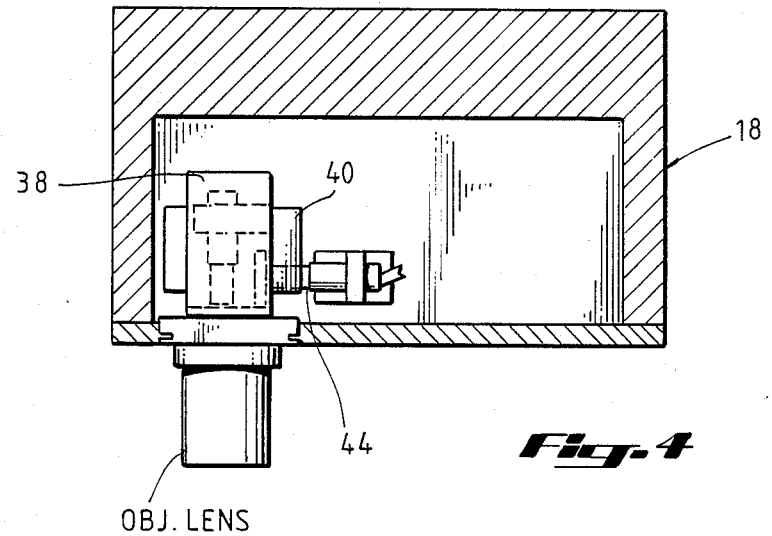
FIG. 4 is a diagram of the lens positioner viewed from the front of the head.

Referring to FIG. 4, a view from the front of the microscope housing shows the objective lens mount and its position relative to the Z-axis piezoelectric positioner, and the Z-axis eddy current sensor. Similarly, the piezoelectric positioner and eddy current sensor for the X-axis direction of lens movement is shown.

Figure 5:
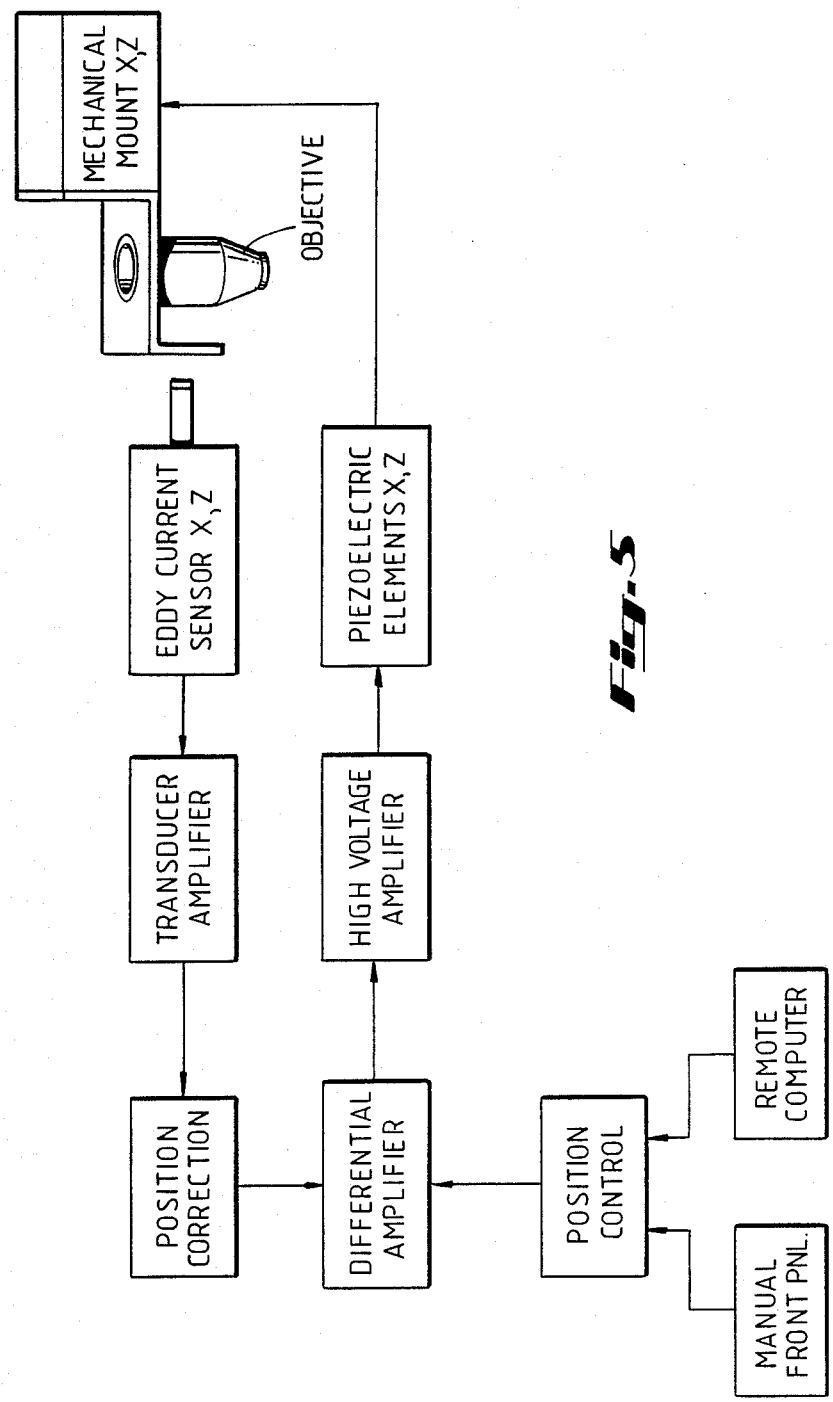
FIG. 5 is a block diagram of the objective lens positioner and control system.

FIG. 5 illustrates in block diagram form the objective lens positioner system in accordance with the present invention. The mechanical mounting of the objective lens and an X-Z plane is indicated. Mechanical input to move the objective lens is provided by piezoelectric elements. The position of the objective lens is detected by eddy current sensors. As indicated, the output signal from each sensor transducer is amplified and combined with a position correction input. The composite signal is applied as an input to a respective X-axis or Z-axis differential amplifier. The other input to each differential amplifier is a position control signal obtained from either a manual, local input, or from a remote, automatic input. The manual input can be a control on the front panel of the microscope. The remote input can be a computer generated signal. The output of the differential amplifier is applied to a high voltage amplifier for driving the piezoelectric elements. It will be appreciated that the system shown in FIG. 5 illustrates a novel feedback system in the scanning microscope art.

Figure 6A:
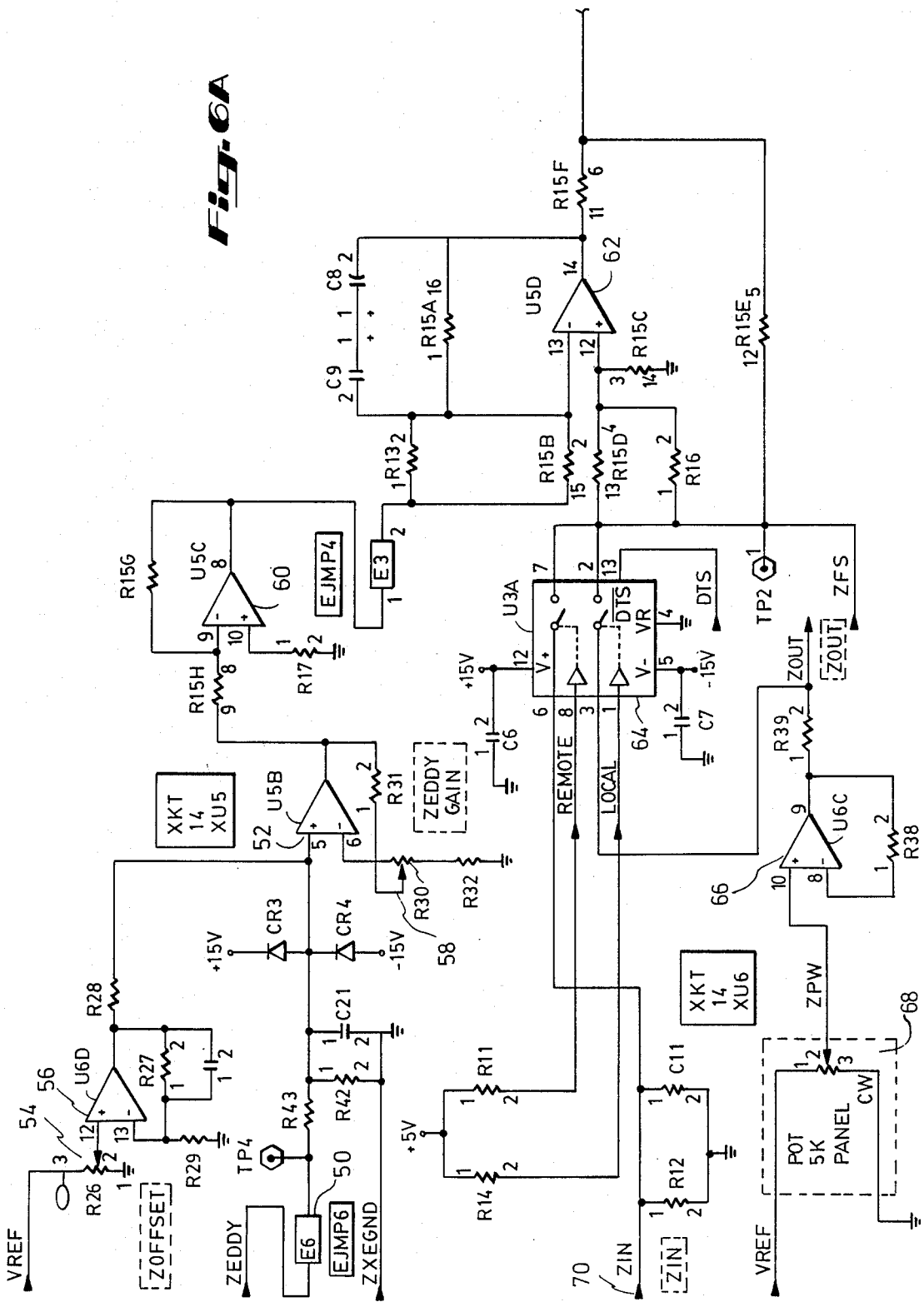
FIG. 6 is a schematic diagram of the circuitry for position control system.
Figure 6B:
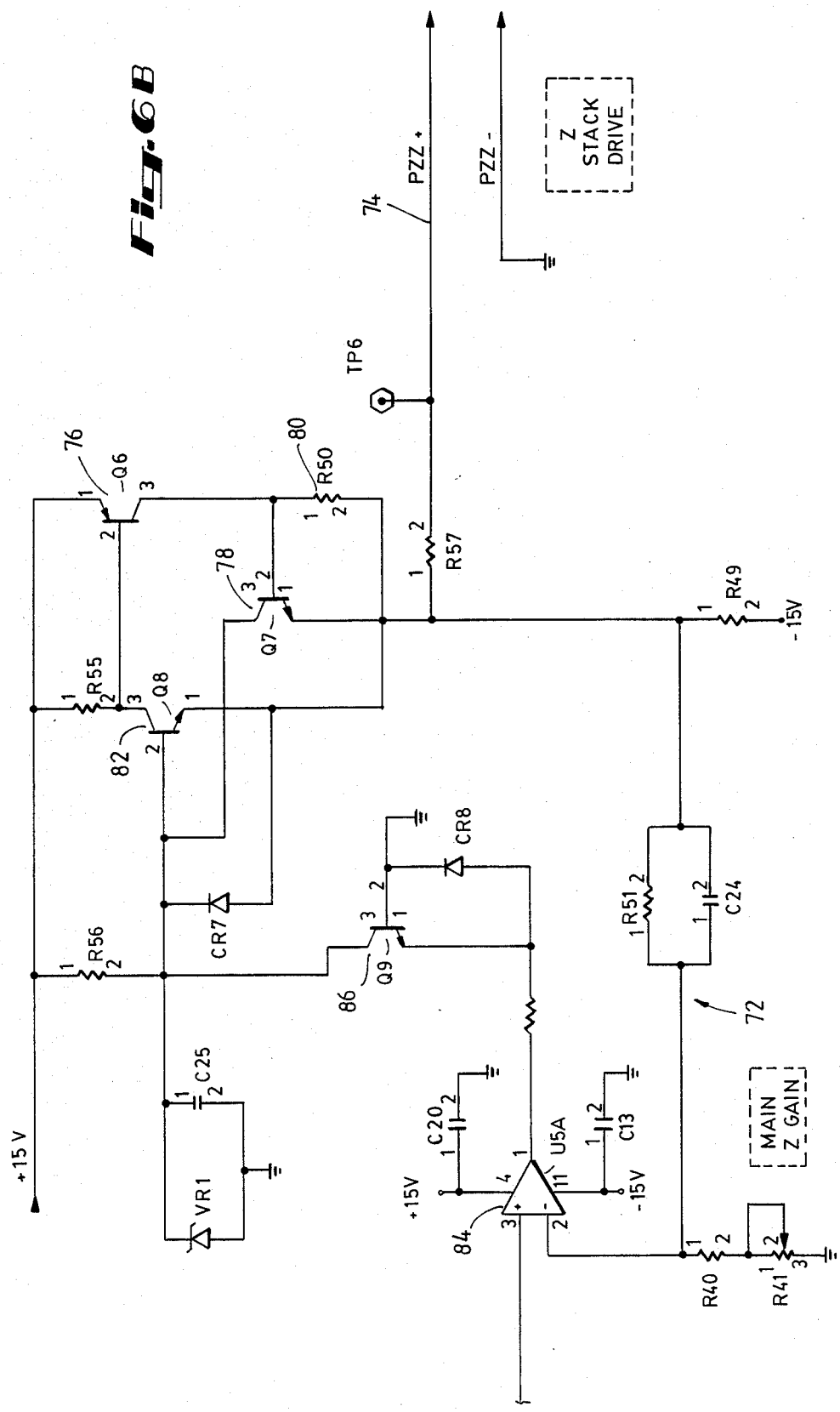

In FIG. 6, a schematic diagram of the Z-axis position control system for the lens positioner is presented. The voltage of the eddy current sensor amplifier output is applied via terminal 50 as an input to amplifier stage 52. A reference voltage established on potentiometer 54 provides an offset correction to compensate for positioning error in the sensor The reference voltage is applied by amplifier 56 to the input of gain stage 52. The offset reference voltage and the eddy current sensor voltage are summed by amplifier 52. Potentiometer 58 in the feedback network of amplifier 52 establishes the gain setting.

The output of amplifier 52 is applied to a unity gain amplifier stage 60. The output of amplifier 60 is applied to the inverting input of differential amplifier 62. The non-inverting input of differential amplifier 62 receives an input from analog switch 64. This switch selects either the Remote or the Local position setting input. If the Local input is selected, the signal input to differential amplifier 62 is from voltage follower 66. The input to stage 66 is from a potentiometer 68 coupled to a reference voltage. If the Remote input is selected by switch 64, the input to differential amplifier 62 is obtained from a Remote source coupled to input terminal 70. Preferably, the Remote source would be a computer generated signal. Either the Remote or the Local input provides the desired position-setting input to the feedback control system.

The output of differential amplifier 62 provides an output error signal for driving the lens positioning mechanism to a proper location The output signal is applied to a high voltage amplifier stage 72 The output voltage to the piezoelectric positioning element is available at terminal 74. The voltage at terminal 74 is established between +150 volts and −15 volts based upon the amount of current drive through transistor 76. Current limiting protection for the piezoelectric element is provided by transistor 78. When current flow through resistor 80 develops a sufficient voltage to turn-on transistor 78, base current is removed from transistor 82. This in turn reduces the current flow through transistor 76. Amplifier stage 84 and transistor 86 provide buffering of the differential amplifier 62 output signal.

The circuitry for the X-axis position control is identical to that of FIG. 6.

The X-axis, Z-axis position control of the objective lens provides a unique feature of recording extended focus or range images by continually changing the focus level while recording one photographic image. Two range images of the same vertical depth "slice" but with inclined axes of focusing, achieved by a combination of a small lateral movement (X) while focusing (Z), constitute a stereo pair.

The foregoing description of the invention has been directed to a particular preferred embodiment for purposes of explanation and illustration. It will be apparent, however, to those skilled in this art that many modifications and changes may be made without departing from the essence of the invention. It is the applications' intention for the following claims to cover such equivalent modifications and changes as fall within the scope of the invention as defined by the following claims.

What is claimed is:

1. A method of stereo image collection with a confocal tandem scanning reflected light microscope having a specimen stage and an objective lens, comprising the steps of:

moving the objective lens vertically and laterally relative to the specimen stage with piezoelectric elements, each element being mechanically coupled to the lens and actuated in response to an electrical input signal;

sensing position of the objective lens with eddy current sensors mounted in proximity to the lens and producing respective sensor output signals indicative of lens vertical and lateral position;

controlling the movement of the lens between first and second imaging position to produce two range images at the same vertical depth of plane of focus within a specimen, by comparing a vertical positioning electrical input signal with the vertical position sensor output signal, and comparing a lateral positioning electrical input signal with the lateral position sensor output signal, to produce respective electrical input signals actuating the piezoelectric elements for movement of the lens.

* * * * *